United States Patent
Chen et al.

(10) Patent No.: US 6,643,718 B1
(45) Date of Patent: Nov. 4, 2003

(54) METHOD AND APPARATUS FOR CONTROLLING ORDER DEPENDENCY OF ITEMS IN A MULTIPLE FIFO QUEUE STRUCTURE

(75) Inventors: Chao-Yu Chen, SanChung (TW); Hui-Neng Chang, Pa-Te (TW); Sui-His Chu, Chung-Ho (TW)

(73) Assignee: Silicon Integrated Systems Corporation, Hsinchu (TW)

( * ) Notice: Subject to any disclaimer, the term of this patent is extended or adjusted under 35 U.S.C. 154(b) by 538 days.

(21) Appl. No.: 09/621,070

(22) Filed: Jul. 21, 2000

(51) Int. Cl.[7] ............................................. G06F 9/315
(52) U.S. Cl. ........................... 710/55; 710/52; 710/54; 365/189.05
(58) Field of Search ............................. 710/52, 53, 54, 710/55, 58; 711/132, 169; 375/340; 365/189.05; 709/100, 106; 712/245

(56) References Cited

U.S. PATENT DOCUMENTS 4,852,127 A  *  7/1989  Fraser et al. .................. 375/340

* cited by examiner

Primary Examiner—B. James Peikari (57) ABSTRACT

A barrier control scheme controls the order dependency of items in a multiple FIFO queue structure. The barrier control scheme includes a cycle ID generator, a barrier bit/barrier ID generator and a cycle ID and barrier ID comparator. Each incoming item to the FIFOs is assigned a cycle ID. If an incoming item of a first FIFO has order dependency on items of a second FIFO, a barrier bit is set and a barrier ID is determined and generated by the barrier bit/barrier ID generator. The barrier bit and barrier ID are inserted in the first FIFO along with other fields of the incoming item. When an item is to be consumed, the cycle ID and barrier ID comparator compares its barrier ID and the cycle IDs of items in the second FIFO. The item to be consumed is blocked until all items on which the item is dependent are consumed in the second FIFO.

19 Claims, 8 Drawing Sheets

| Queue level | Background Q | Foreground Q | Memory Access | Cycle no. |
|---|---|---|---|---|
| 3 | | WRT A | bank A miss write | 3 |
| 2 | | RD A | bank A hit read | 2 |
| 1 | PRE A, ACT A | WRT A | bank A hit write | 1 |
| 0 | --- | --- | preceding access | --- |

METHOD AND APPARATUS FOR CONTROLLING ORDER DEPENDENCY OF ITEMS IN A MULTIPLE FIFO QUEUE STRUCTURE

FIELD OF THE INVENTION

The present invention relates to the design of a FIFO queue and more particularly to the design of the control of order dependency between items of a multiple FIFO queue structure.

BACKGROUND OF THE INVENTION

In a highly integrated system, a memory subsystem may be accessed by multiple devices and working in a multi-tasking mode. Under this circumstance, how to gain maximum data bandwidth to enhance system performance and meet latency requirement becomes an important issue. In the field of memory controller design, some apparatus that optimizes the utilization of a DRAM bus has been developed and implemented. At the time when a memory controller receives a memory access request, correct memory commands must be generated based on current SDRAM internal status.

In a memory controller circuit, there are typically two separate queues for storing different memory commands. One is pre-charge/activate command queue and the other is read/write command queue. Memory commands are divided into pre-charge/activate commands and read/write commands that are pushed into the pre-charge/active command queue or the read/write command queue respectively. In general, read/write commands include memory read and memory write commands that are concerned with data transfer. Pre-charge/activate commands are the other SDRAM commands for the preliminary operations before the actual read/write preliminaries. When a pointed command in the queues satisfies all the required conditions, this command will be issued onto DRAM bus at the earliest allowable time.

Because pre-charge/active commands are not related to data transfer, they can be issued during the interval that the data bus is busy but the command bus is free. In other words, pre-charge/activate commands can be overlapped with read/write commands. Therefore, both pre-charge/activate command and read/write command queues are used to issue pipelined memory commands to gain maximum bus utilization. However, because pre-charge/active commands and read/write commands are popped from different queues, pre-charge/activate commands of a corresponding read/write command may be issued too early to prevent the read/write command from working correctly if the two queues are not controlled properly to ensure the order dependency between commands.

Figure 3:
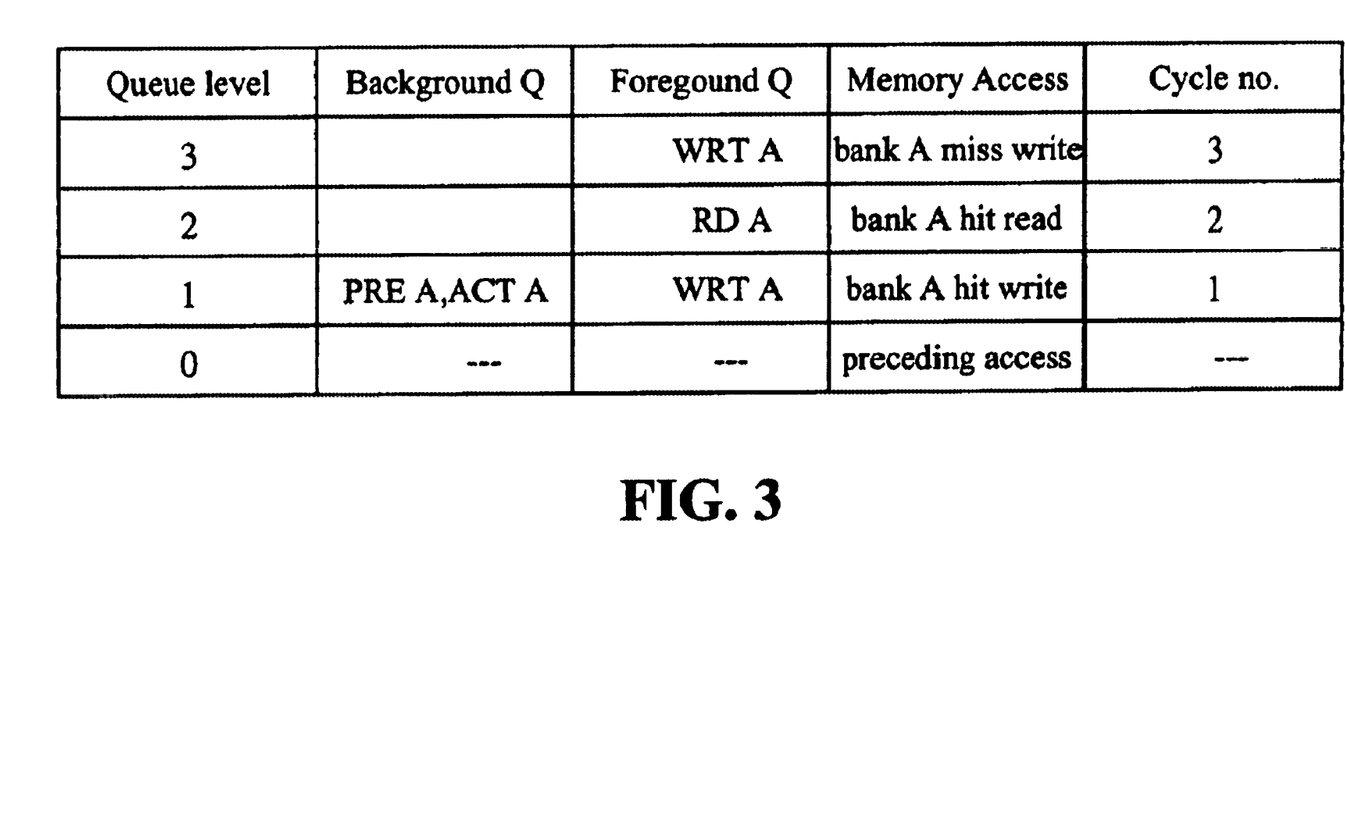
FIG. 3 shows an example for the order dependency in foreground and background queue operation of a memory controller.

For example, FIG. 3 shows the operation of three cycles of accessing a memory bank A. Cycle 1 is a hit write cycle on bank A, cycle 2 is a hit read cycle on bank A and cycle 3 is a miss write cycle on bank A. After a command is generated, the read/write queue (foreground queue FQ) and the pre-charge/activate queue (background queue BQ) are formed as shown in FIG. 3. The cycle 3 which is a miss write cycle is decoded into pre-charge (PRE) bank A command, activate (ACT) bank A command and write (WTT) bank A command. PRE bank A and ACT bank A commands are pushed into BQ level 1 while the corresponding WTT bank A command is pushed into FQ level 3 because the write bank A command of cycle 1 and the read bank A command of cycle 2 are already in the levels 1 and 2 of FQ. In this case, obviously, the PRE band A and ACT bank A commands of BQ level 1 can not be issued before the read bank A command in FQ level 2 (cycle 2) is finished. Otherwise, the read command of cycle 2 will read data from an undesired page which is associated with the write bank A command of cycle 3.

In the above example, if the order dependency is not considered carefully in designing the queues, PRE A and ACT A may be issued right after the completion of FQ level 1 because all the conditions for BQ level 1 within its own queue are satisfied at that moment. Therefore, before issuing a background command, order dependency checking for read/write commands is required to ensure that memory access can function properly at the desired memory location.

Figure 1:
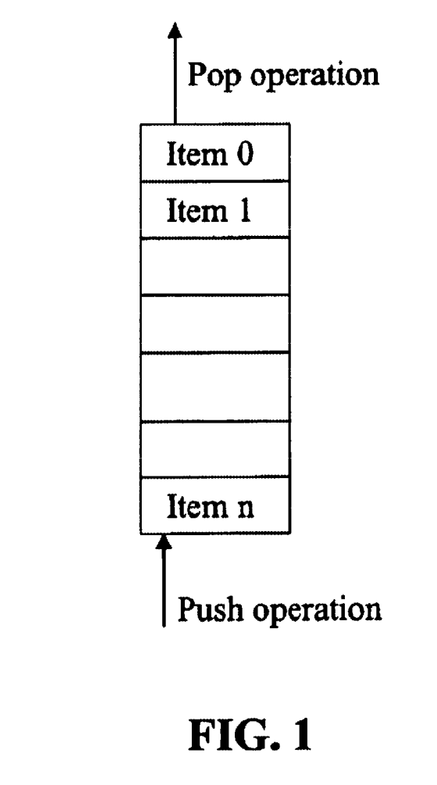
FIG. 1 shows a typical first in first out (FIFO) queue structure.
Figure 2:
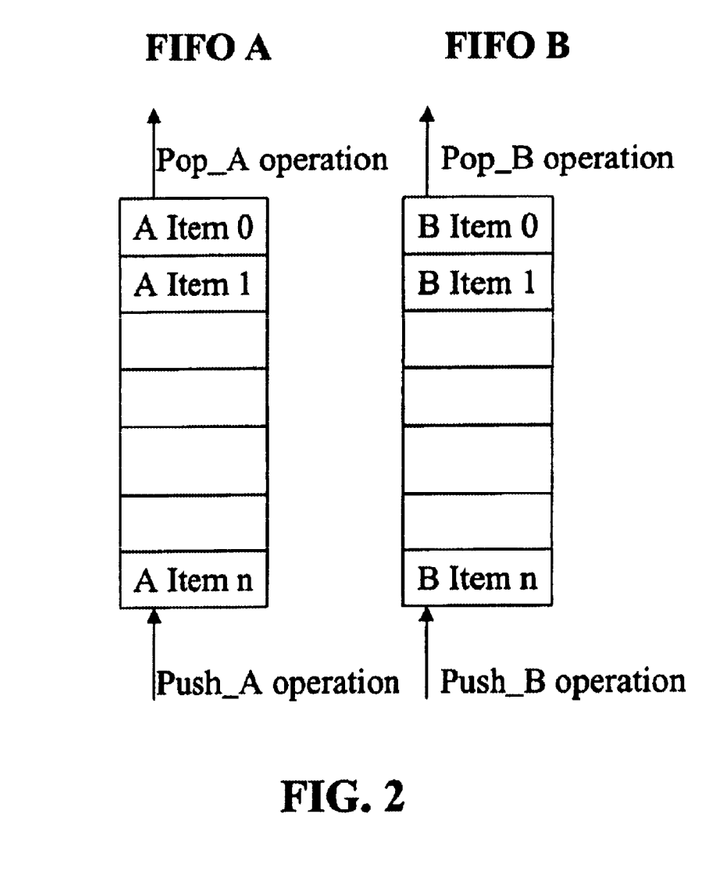
FIG. 2 shows a multiple (2-way) FIFO queue structure.

The command queue discussed above is usually implemented by a first-in-first-out (FIFO) queue structure as shown in FIG. 1. The basic operations for a FIFO are push and pop operations that insert incoming items into the FIFO and consume outgoing items from the FIFO respectively. In general, a 2-way FIFO queue structure is composed of two FIFOs and the operations of each FIFO queue work independently and concurrently with respect to the other FIFO queue. Although a 2-way FIFO structure as shown in FIG. 2 provides higher performance because of the concurrent operations, it is difficult to maintain the order dependency between items in the two different FIFOs.

SUMMARY OF THE INVENTION

This invention has been made to overcome the above-mentioned difficulty in optimizing the performance and controlling the order dependency of items in a multiple FIFO queue structure. The primary object of the invention is to provide a barrier control scheme for controlling the order dependency of items between two FIFO queues with optimal parallelism. Accordingly, the barrier control scheme comprises a cycle ID generator, a barrier bit/barrier ID generator and a cycle ID and barrier ID comparator.

The cycle ID generator generates a sequential number as the cycle ID for each incoming item of the multiple FIFOs. For an incoming item to be inserted into a first FIFO, the item is also given a barrier bit and a barrier ID. The barrier bit/barrier ID generator determines the barrier bit and the barrier ID of the incoming item inserted into the first FIFO. If the incoming item is dependent on items of a second FIFO, the barrier bit is set to 1 and the barrier ID is generated according to the order dependency. The cycle ID and barrier ID comparator compares the barrier ID of an outgoing item of the first FIFO with the cycle ID of the outgoing item of the second FIFO to determine if the outgoing item of the first FIFO should be blocked or not.

It is also an object of the invention to provide a method of generating the barrier bit and the barrier ID of an incoming item of the first FIFO based on order dependency of the incoming item with respect to items in the second FIFO. According to the invention, the barrier bit is set to 0 and the barrier ID is in a don't care condition if there is no dependency. Otherwise, the barrier bit is set to 1 and the barrier ID is generated according to how the incoming item is dependent on the items in the second FIFO. In the present invention, each FIFO has a PUSH pointer. In the second FIFO, the latest item on which the incoming item of the first FIFO is dependent is the one nearest to the PUSH pointer. Based on the location of the PUSH pointer and the order dependency, the invention provides a method which can be implemented by a combinational logic circuit to generate the barrier ID.

It is yet another object of the invention to provide a top-down decision tree for the cycle ID and barrier ID comparator to compare a cycle ID and a barrier ID. To avoid ambiguity in comparison, the cycle ID of this invention is given one bit more than the number of bits required in representing the maximum number of items in the multiple FIFOs. The top-down decision tree is formed by comparing a cycle ID with a barrier ID bit by bit from the highest bit to the lowest bit.

According to the order of the cycle ID and the barrier ID, the decision tree comprises a plurality of leaf nodes and non-leaf nodes. A non-leaf node indicates a comparison condition and a leaf node indicates a comparison result. If the cycle ID is greater (or later) than the barrier ID, a leaf node shows a true result. Otherwise, a leaf node shows a false result. By traveling through the top-down decision tree, the cycle ID and barrier ID comparator can determine if an outgoing item in the first FIFO should be blocked or not based on whether the leaf node is false or true.

Other features, objects and advantages of the invention will become better understood from the following detailed description of the invention which refers to the accompanying drawings.

DETAILED DESCRIPTION OF THE PREFERRED EMBODIMENTS

A few terms are used throughout this specification to describe novel features of the invention that have not been found in the prior arts. Although these terms are defined in the Summary of the Invention as well as in the following paragraphs, a detailed description of them will be given first for clarity because of their criticality and novelty.

Figure 4:
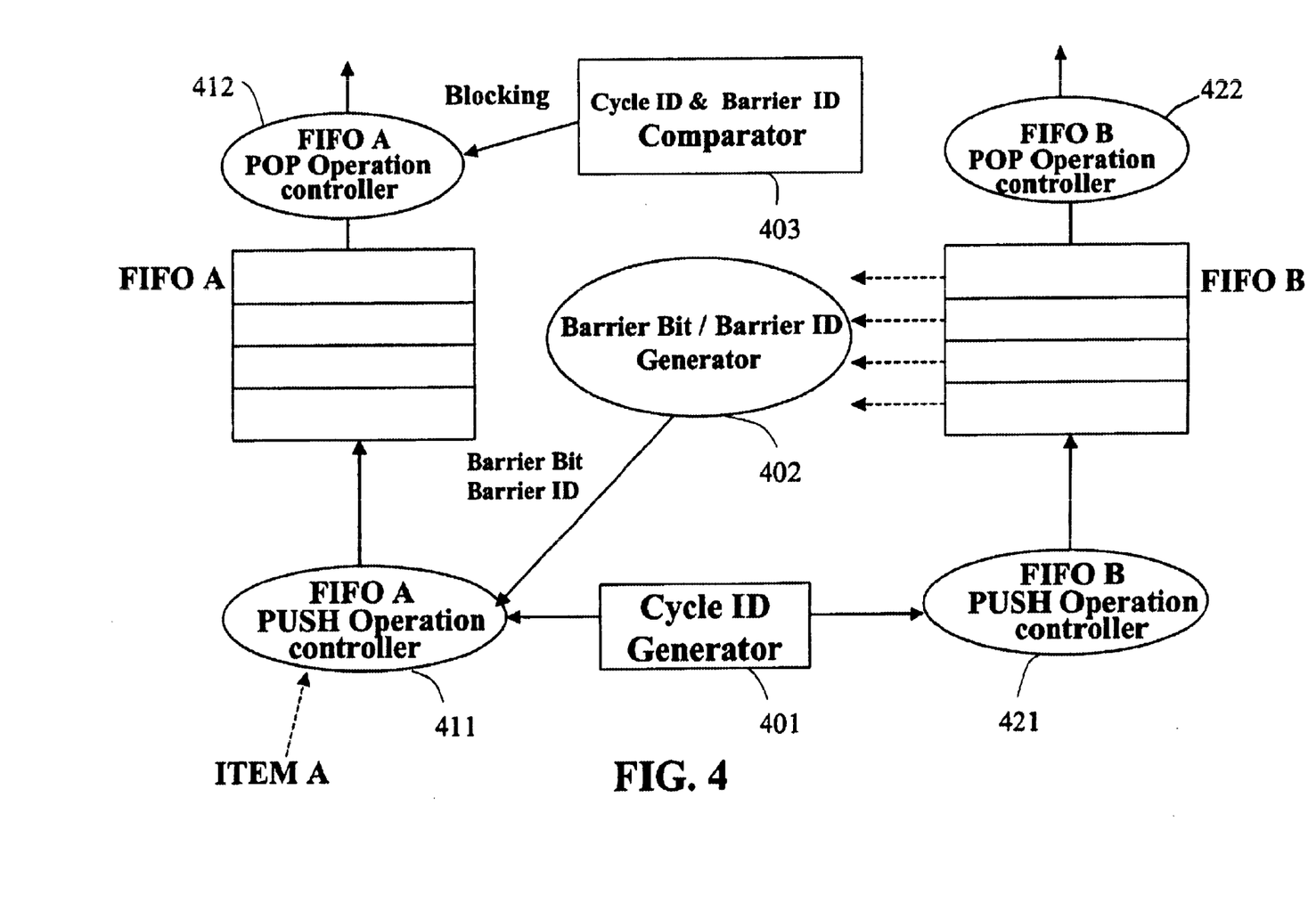
FIG. 4 shows the structure of the barrier control scheme according to the present invention.

The present invention comprises a multiple FIFO queue structure as shown in FIG. 4. There are two queues, i.e., FIFO A and FIFO B. When a command item enters the multiple FIFO queue structure, it is given a sequence number to identify the order of its entrance. In the following description, this sequence number of a command item is called a "cycle ID".

As shown in FIG. 4, the command item pushed into FIFO A has dependency on the command items in FIFO B. An item in FIFO A may not be consumed or serviced until some item in FIFO B has been consumed. In other words, the item in FIFO A may have a barrier before it can be consumed and the barrier is the item in FIFO B that has to be consumed first. Therefore, in the present invention a "barrier bit" and a "barrier ID" are assigned to the item in FIFO A in addition to its "cycle ID" to describe this barrier.

This invention provides a barrier control scheme to control the dependency. A "barrier bit" is used to indicate if an item in a FIFO has a barrier or not. A "barrier ID" is used to represent the "cycle ID" of the item to depend on. As an example, it is assumed that item A in FIFO A cannot be consumed until item B in FIFO B is consumed. Therefore, item B is the barrier of item A. The "barrier bit" of item A is set to 1 to indicate that it has a dependency. The "barrier ID" of item A is the "cycle ID" of item B.

With reference to FIG. 4, the structure of the barrier control scheme of the present invention comprises a cycle ID generator 401, a barrier bit/barrier ID generator 402, and a cycle ID and barrier ID comparator 403 for controlling the order dependency of items in FIFO A and FIFO B. A PUSH operation controller 411 and a POP operation controller 412 control the operation of FIFO A. Similarly, a PUSH operation controller 421 and a POP operation controller 422 control the operation of FIFO B.

Assume that the consumption of an outgoing item in FIFO A depends on the order between this outgoing item and some items in FIFO B and the consumption of items in FIFO B is independent of the items in FIFO A. Accordingly, the PUSH and POP operations of FIFO B are operated concurrently and independently all the time without any limitation. The PUSH and POP operations of FIFO A are also operated concurrently most of the time. However, the POP operation of FIFO A may be blocked some time for the purpose of controlling the order of items with respect to items in FIFO B.

The cycle ID generator 401 generates a sequential cycle ID for each incoming item of FIFO A and FIFO B. When an incoming item, say item A, is going to be pushed into FIFO A, the barrier bit and barrier ID generator 402 checks the dependency between item A and all relevant items in FIFO B and generates a barrier bit/barrier ID for item A. The PUSH operation controller 411 of FIFO A will insert the incoming item A with its cycle ID, given by cycle ID generator 401, and its barrier bit/barrier ID, generated by the barrier bit/barrier ID generator 402, altogether into FIFO A.

When item A becomes the outgoing item of FIFO A and is waiting to be consumed, the POP operation controller 412 of FIFO A checks the value of the barrier bit and the comparison result from the cycle ID and barrier ID comparator 403 that compares the cycle ID of the outgoing item of FIFO B with the barrier ID of the outgoing item of FIFO A all the time. If the cycle ID is greater than the barrier ID, the comparison result is TRUE. Otherwise, the comparison result is FALSE.

Figure 5:
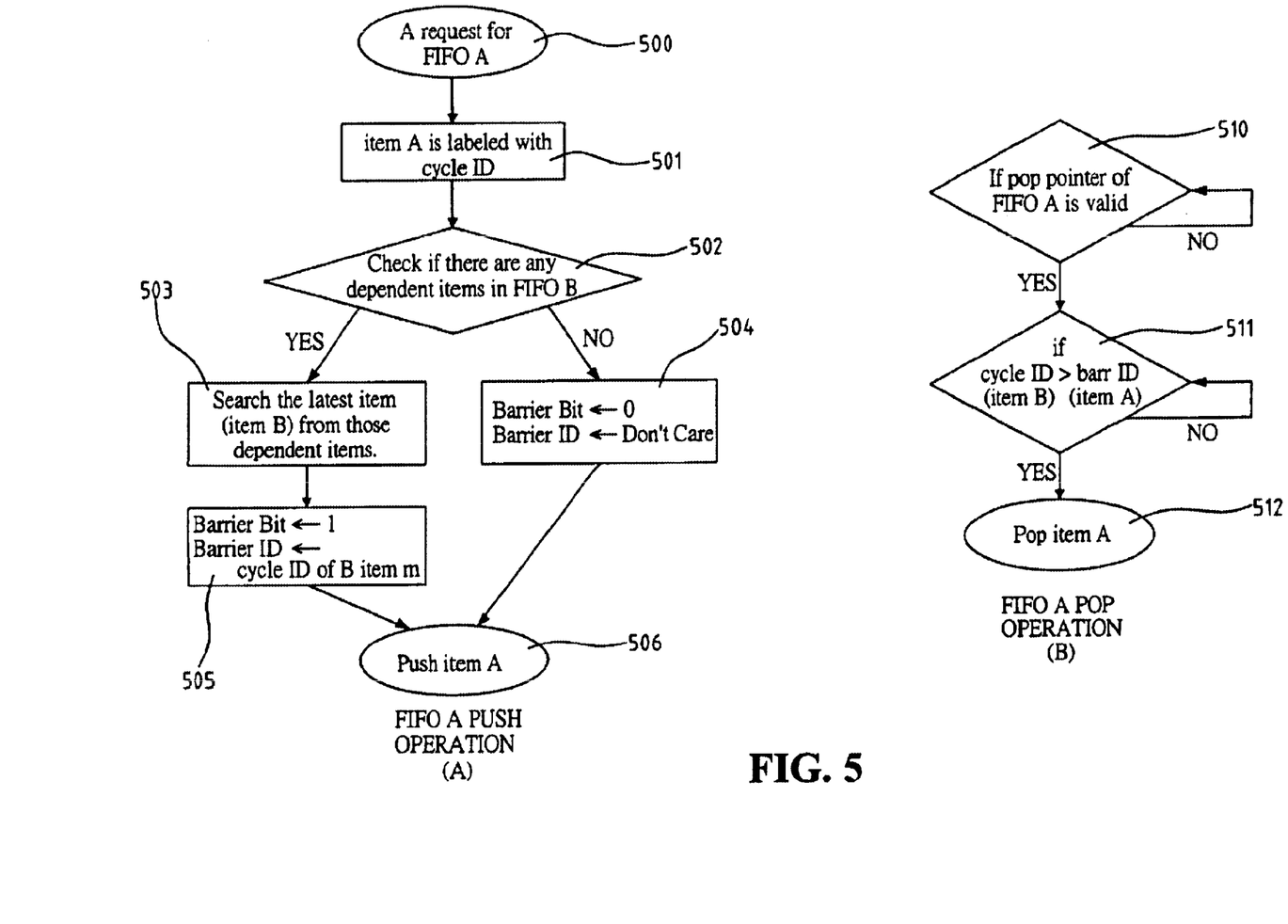
FIGS. 5A and 5B show the flow chart of PUSH/POP operations for FIFO A according to the present invention.

In this description, "a cycle ID is greater than a barrier ID" means that the cycle ID is generated later in time although in reality the actual ID number may not be greater because of the fact that the cycle IDs are recycled as discussed later. The outgoing item of FIFO A will be blocked only if the barrier bit is '1' and the comparison result from the comparator 403 is FALSE which means that there are still some items in FIFO B that should be consumed before this outgoing item. FIGS. 5A and 5B show the flow charts for PUSH and POP operation controllers of FIFO A respectively.

As shown in FIG. 5A, step 500 shows that an item A is entering FIFO A. Item A is labeled with a cycle ID in step

501. The dependency between item A and items in FIFO B is checked in step 502. If there is no dependency, the barrier bit of item A is set to 0 and the associated barrier ID is in a don't care condition as shown in step 504. If there is some dependency, the latest relevant item, i.e., item B is searched in step 503. The barrier bit of item A is set to 1 and the associated barrier ID is set to be the cycle ID of item B in step 505. Item A and its associated barrier bit and barrier ID are pushed into FIFO A in step 506.

As shown in FIG. 5B, step 510 checks if an item is to be popped out of FIFO A. If item A is to be popped out, the barrier ID of item A is checked against the cycle ID of exiting items in FIFO B until item B exits and the cycle ID of item B is compared with the barrier ID as shown in step 511. Item A is then allowed to pop out of FIFO A in step 512.

The above description assumes that the outgoing items of FIFO B are independent of the items in FIFO A. The same barrier control scheme would also be implemented to control the outgoing items of FIFO B if there is also some order dependency which requires that items in FIFO A be consumed before items in FIFO B. Based on the idea described above, the functional blocks of the barrier control scheme are discussed in more detail as follows.

In order to identify and control the order of items in FIFO A and FIFO B, a cycle ID is required for each inserted item. When an incoming item is inserted into a FIFO (FIFO A or FIFO B), a cycle ID is assigned and inserted into the FIFO along with other fields of the item. The Cycle ID generator 401 generates a sequential cycle ID for each incoming item and an identical cycle ID is given to two incoming items, one for FIFO A and the other for FIFO B, if they come at the same time. The cycle ID is increased by one after a cycle ID is given. In the preferred embodiment of this invention, the cycle ID generator 401 is a counter for increasing the ID number and the increment of the counter is controlled by the logic-OR operation of FIFO A and FIFO B insertion operations.

Because the cycle ID number is recycled when the number is overflowed, the size of the cycle ID counter should be carefully selected. In order to make sure that each cycle ID of an item in the FIFOs is unique, the number of available cycle IDs should be no less than the capacity in the FIFOs. As an example, if the total number of items that can be held in the FIFOs is 8 (the depth is 4 for each FIFO), the cycle ID counter should be 3-bit wide at least.

Figure 8:
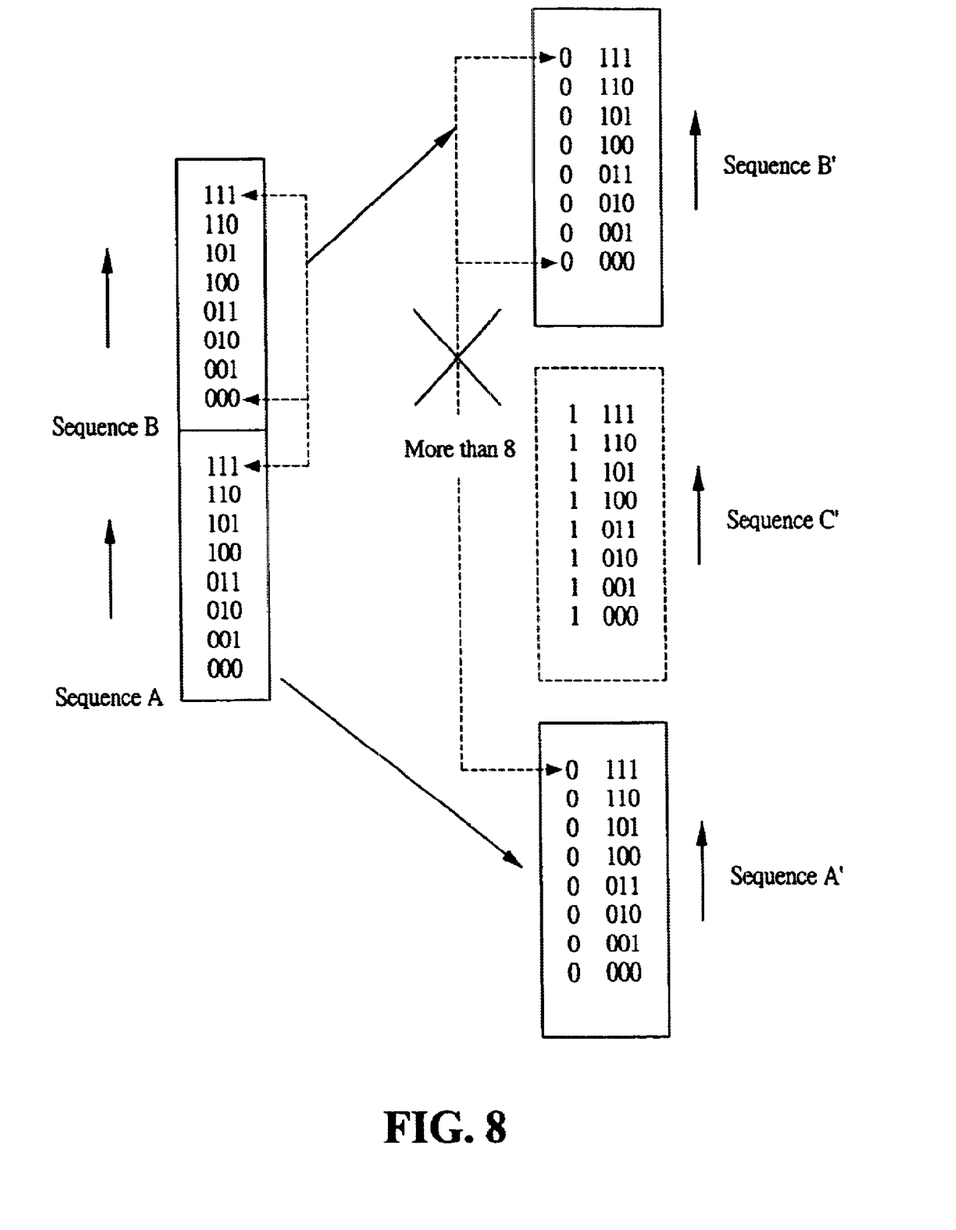
FIG. 8 shows why the size of the cycle ID generation counter should comprise one bit more than the number of bits required to represent the maximum number of items that can be held in the multiple FIFOs.

However, since the cycle ID and barrier ID comparator 403 should compare a cycle ID with a barrier ID which is in the same range as the cycle ID, a 4-bit wide cycle ID is required to avoid ambiguity in the comparison. As illustrated in the left hand side of FIG. 8, if a 3-bit wide cycle ID counter is used to represent the 8 unique numbers, a set of 8 cycle IDs are generated in sequence repeatedly, such as sequence A and then sequence B. Under such circumstance, the order of any two cycle IDs is ambiguous and thus can not be determined by the cycle ID and barrier ID comparator 403.

For instance, whenever the barrier ID is "000" in sequence B and the cycle ID is "111", the comparator 403 can not determine the order of the barrier ID and the cycle ID because the cycle ID "111" may be the one in sequence A generated earlier than the barrier ID or the one in sequence B generated later than the barrier ID. Therefore, the order of the two IDs is ambiguous and can not be determined. In order to avoid the ambiguity, the cycle ID counter should be one bit longer. As shown in the right hand side of FIG. 8, since an additional significant bit is added, the cycle IDs generated are sequence A', sequence C' and then sequence B'. The order of any two cycle IDs can never be ambiguous anymore because a cycle ID is not repeated within the range of 8 items.

Barrier bit and barrier ID fields are required in each item of FIFO A to record its dependency with respect to the items in FIFO B. When the barrier bit is '0', it means that no dependency exists and the item can be consumed concurrently. When the barrier bit is '1', it indicates that the item should be blocked until the latest relevant item, identified by the barrier ID, in FIFO B has been consumed.

Before an incoming item, say item A, is inserted into FIFO A, the barrier bit/barrier ID generator 402 checks all valid items in FIFO B to see if there is any valid item that needs to be consumed before item A. If there is no such item, the barrier bit of item A is set to '0' and the barrier ID is in a "DON'T CARE" condition. On the contrary, if there are some valid items in FIFO B that should be consumed before item A, the barrier ID generator 402 determines the cycle ID of a valid and relevant item, say item B, which is inserted into FIFO B the latest. The barrier bit of item A is set to '1' and the barrier ID of item A is thus set to the cycle ID of item B.

Figure 6:
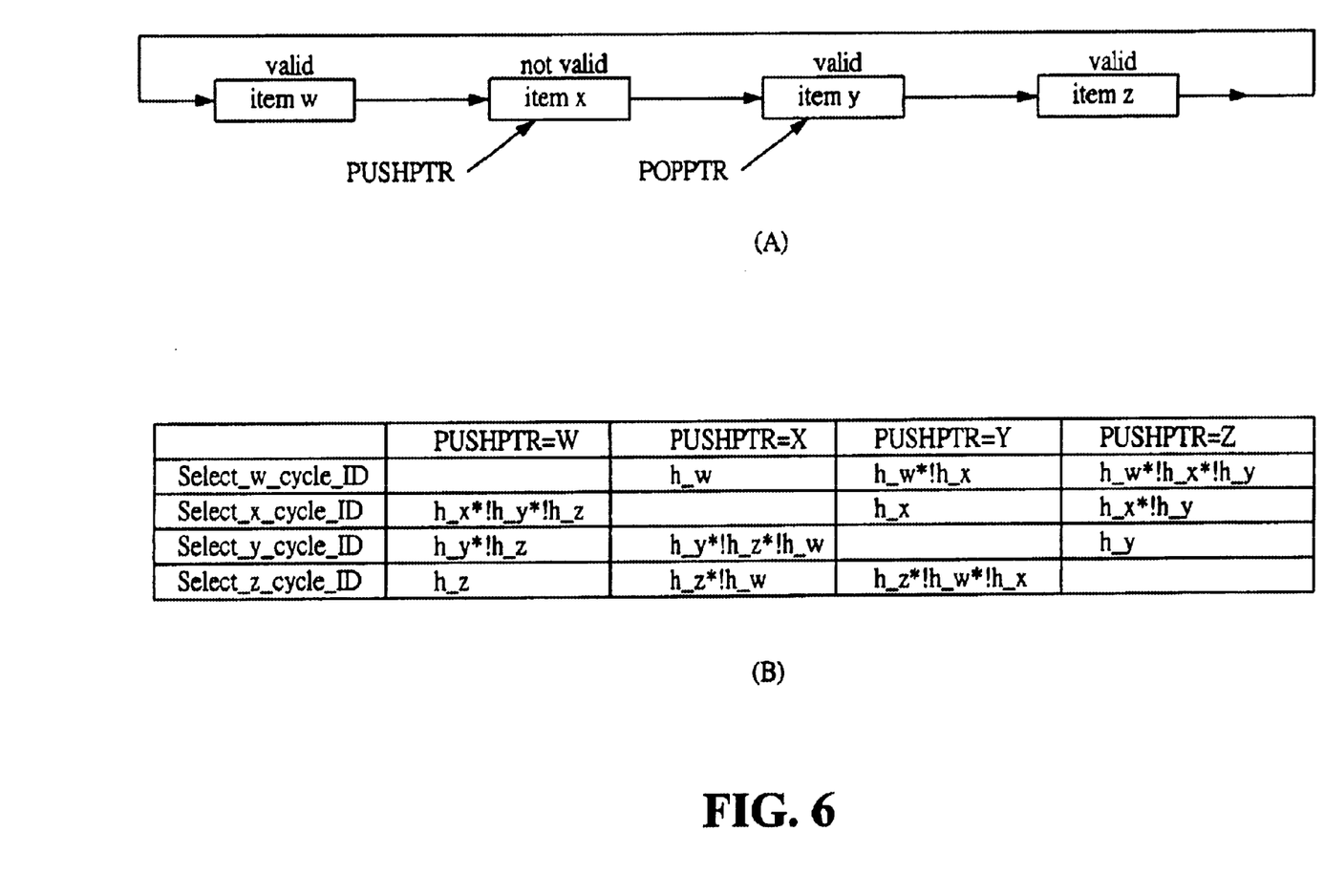
FIGS. 6A and 6B show the method of generating the barrier bit and determining the barrier ID according to the present invention.

FIGS. 6A and 6B show the method of generating the barrier bit and barrier ID according to this invention. FIFO A and FIFO B are implemented by circular FIFO queues as shown in FIG. 6A. The push pointer (PUSHPTR) and pop pointer (POPPTR) of each FIFO queue are rotated. The dependency between item A in FIFO A and all valid items in FIFO B are analyzed in parallel according to the information in the related fields of these items as shown in FIG. 6B. The analyzed results of the dependency are represented by h__w, h__x, h__y and h__z. If the dependency exists between item A and a valid item w of FIFO B, h__w is '1' (TRUE). Otherwise, h__w is '0' (FALSE). The same meanings also apply to h__x, h__y and h__z. If the results of h__w, h__x, h__y and h__z are all FALSE, the barrier bit is set to '0' and the barrier ID is in a "DON'T CARE" condition. Otherwise, the barrier bit is set to '1' and the latest relevant item has to be selected according to the following method.

In the circular FIFO, the latest valid item of the FIFO is the item nearest to the PUSH pointer. Thus, the selection of the latest relevant item is conditioned on the location of the PUSH pointer shown as the columns of the table in FIG. 6B. The second row of the table shows all possible conditions that the cycle ID of item w will be selected to be the barrier ID. In the first condition shown in column 2, item w is invalid and will not be selected because the PUSH pointer points to item w. If the PUSH pointer points to item x as shown in column 3, item w is the latest item and will be selected if h__w is TRUE. If the PUSH pointer points to item y as shown in column 4, item w is the second latest item. So item w will be selected only if h__w is TRUE and h__x is FALSE for the latest item x. Finally, if the PUSH pointer points to item z as shown in the last column, item w is the third latest or the earliest item. Thus, it will be selected only when h__w is TRUE and both h__x and h__y are FALSE.

By the same reasoning, the third row of the table on FIG. 6B shows all possible conditions that the cycle ID of item x should be selected, the fourth row shows all conditions that the cycle ID of item y should be selected and finally the fifth row shows all conditions that the cycle ID of item z should be selected to be the barrier ID. The barrier bit and barrier ID of item A are determined by the barrier bit and barrier ID generator 402 and are inserted into FIFO A along with item A. In general, the barrier bit and barrier ID generator 402 is implemented by a combinational logic circuit which does not result in any timing overhead.

The barrier bit and the comparison result provide sufficient information for the blocking mechanism of the POP operation controller of FIFO A. If the barrier bit of item A is '0', it means that item A does not depend on any item in FIFO B and item A can be consumed immediately. On the contrary, if the barrier bit of item A is '1', the blocking mechanism is determined by the result of the cycle ID and barrier ID comparator 403. If the result is TRUE, which means that the cycle ID of the outgoing item in FIFO B is greater (or later) than the barrier ID of item A, all relevant items in FIFO B have been consumed and item A can be consumed immediately. Otherwise, item A will be blocked until the result becomes TRUE.

The following will describe how to compare the values of the cycle ID and the barrier ID. As mentioned earlier, although a 3-bit cycle ID counter is enough to represent the total 8 FIFO items uniquely, the cycle ID should be implemented with a 4-bit counter to avoid the ambiguity in comparing any two cycle IDs. In the sequence of 16 numbers of 4-bit cycle IDs, the order of any two cycle IDs within the distance of 8 is not ambiguous and thus the order can be determined without any ambiguity. The comparison algorithm is based on a decision tree shown in FIG. 7. The non-leaf nodes are the comparison conditions and the leaf nodes are the result of the comparison. If a cycle ID is greater or later than the barrier ID, the result is "TRUE". Otherwise, the result is "FALSE".

Figure 7:
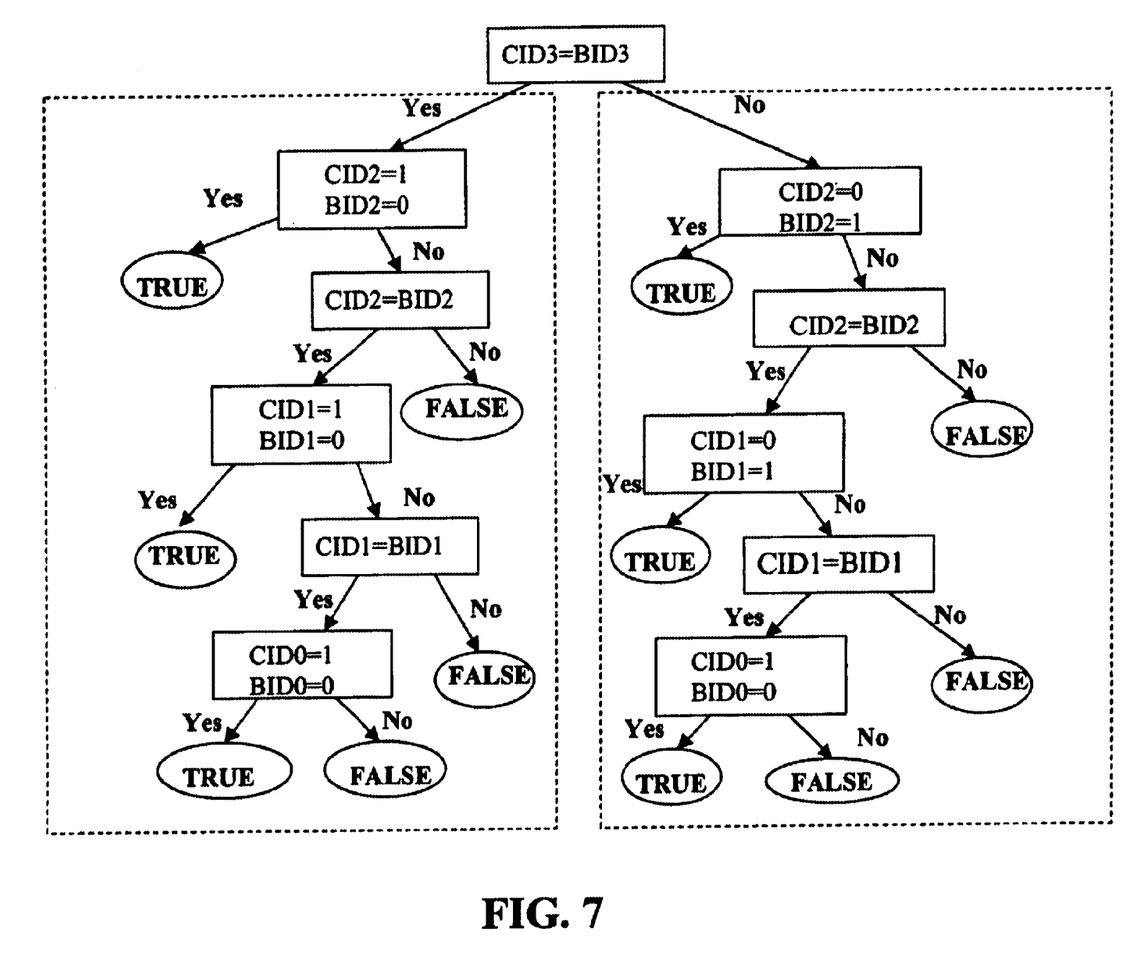
FIG. 7 shows the decision tree for comparing a cycle ID with a barrier ID.

In general, the comparison is done bit-wise from the highest bit to the lowest bit. Therefore, the decision tree is traveled top-down from the root to the leaf-nodes conditioned on the higher bit to the lower bit. The condition at the root node divides the comparison into two cases. In FIG. 7, the left-hand-side sub-tree illustrates that the highest bits (bit 3) of the cycle ID and the barrier ID are equal and the right-hand-side sub-tree illustrates that the highest bit of the cycle ID and the barrier ID are not equal.

Figure 9:
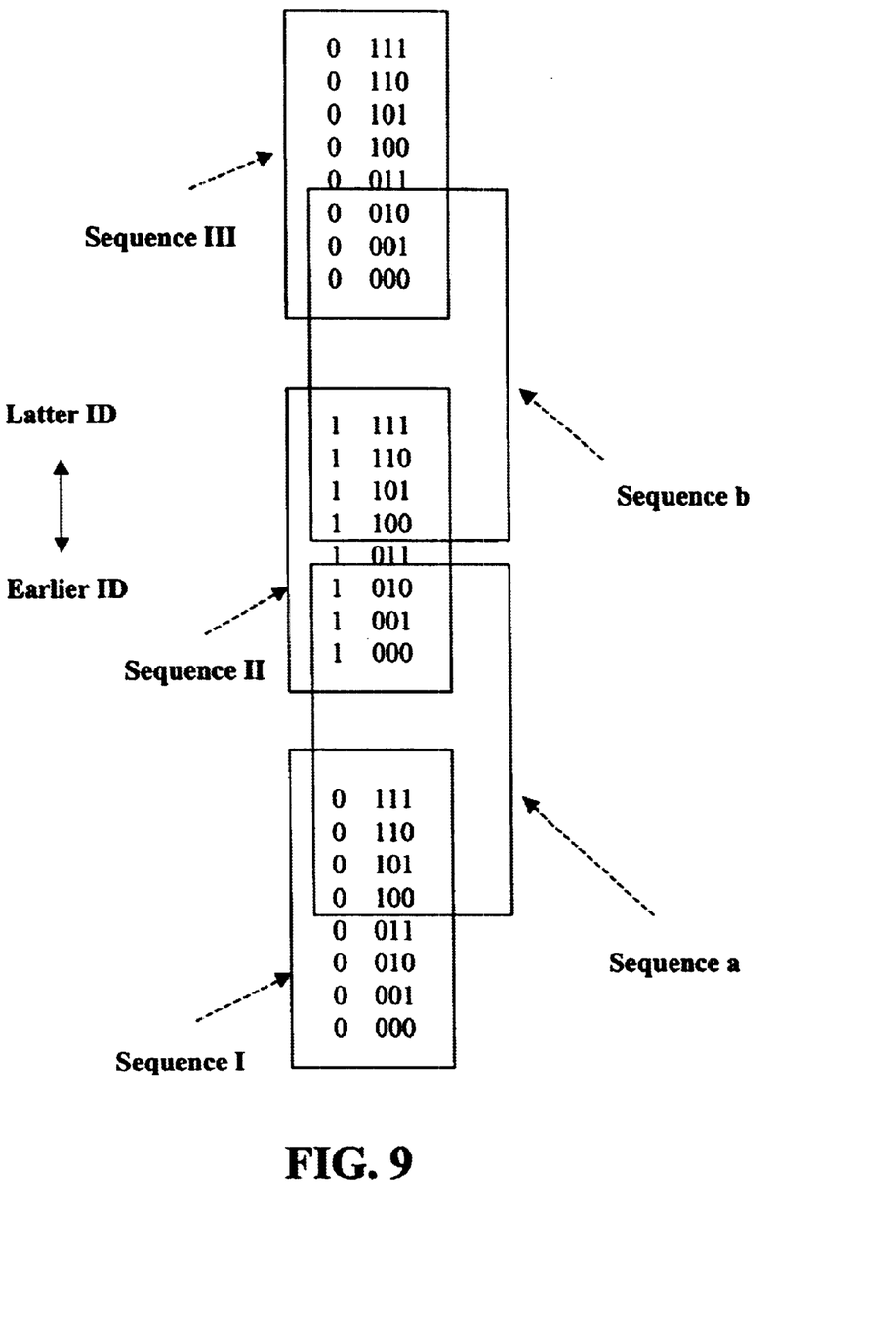
FIG. 9 shows cycle ID and barrier ID comparison.

If the highest bits are identical as in the left-hand-side sub-tree, the two IDs must reside in the same sequence such as sequence I, II or III shown in FIG. 9. Therefore, if the bit 2 of the cycle ID is '1' and the bit 2 of the barrier ID is '0', the cycle ID must be one of the latter four numbers and the barrier ID must be one of the earlier four numbers. As a result, it concludes that the cycle ID is greater or later than the barrier ID. Otherwise, the order can not be determined yet and the decision tree should be traveled downwards on the condition of the bit 2 equality.

If the highest bits are not identical as in the right-hand-side sub-tree, the two IDs must reside in the sequences in which the bit 3's are not equal. If the bit 2 of the cycle ID is '0' and the bit 2 of the barrier ID is '1' such as in sequence a or sequence b shown in FIG. 9, the cycle ID must be one of the latter four numbers and the barrier ID must be one of the earlier four numbers. Therefore, it concludes that the cycle ID is greater or later than the barrier ID. Otherwise, the order can not be determined yet and the decision tree should be traveled downwards on the condition of the bit 2 equality. With the same top-down traversal policy from the highest bit to the lowest bit, the result of the comparison can be determined when a leaf node is reached.

The barrier control scheme of this invention can be used in the memory controller design discussed in the background of the invention. It can also be used in other design applications. For example, if an upstream bridge from a PCI interface to a host bus interface (processing unit interface) is implemented with a 2-way FIFO queue structure that includes one FIFO for write cycles and the other FIFO for read cycles, the order dependency between read and write FIFOs can be guaranteed by the barrier control scheme of this invention.

For simplicity, the barrier control scheme described above is based on a 2-way FIFO queue structure. The barrier control scheme of this invention is a scalable and flexible scheme that can be easily extended to a multiple FIFO queue structure by one skilled in the art. This barrier control scheme provides a practical scheme to control and maintain certain order dependency between items in different FIFOs under multiple FIFO structure design.

Although only the preferred embodiments of this invention were shown and described in the above description, numerous changes in the detailed construction and combination as well as arrangement of parts may be restored to without departing from the spirit or scope of the invention as hereinafter set forth in the appended claims. It is requested that any modification or combination that comes within the spirit of this invention be protected.

What is claimed is:

1. A barrier control scheme for a multiple FIFO queue structure, comprising:
   at least a first FIFO and a second FIFO;
   a cycle ID generator for generating a cycle ID for each incoming item of said first and second FIFOs;
   a barrier bit/barrier ID generator for generating a barrier bit and a barrier ID for an incoming item of said first FIFO; and
   a cycle ID and barrier ID comparator for comparing the barrier ID of an outgoing item of said first FIFO with the cycle ID of an outgoing item of said second FIFO.

2. The barrier control scheme according to claim 1, wherein said cycle ID and barrier ID comparator compares a cycle ID and a barrier ID according to a top-down decision tree having a plurality of leaf nodes and a plurality of non-leaf nodes, each non-leaf node indicating a comparison condition and each leaf node indicating a comparison result, said comparison result being true if the barrier ID corresponds to a cycle ID generated earlier than the cycle ID being compared or false otherwise.

3. The barrier control scheme according to claim 2, wherein said top-down decision tree is formed by comparing a cycle ID and a barrier ID bit-wise from a highest bit to a lowest bit.

4. The barrier control scheme according to claim 1, wherein items of said second FIFO are consumed independently with respect to items of said first FIFO.

5. The barrier control scheme according to claim 1, said cycle ID generator generating a sequential number as cycle IDs for each incoming item of said first and second FIFOs, said sequential number ranging from a first number to a last number and restarting from said first number if said last number is reached.

6. The barrier control scheme according to claim 1, wherein an outgoing item of said first FIFO is blocked if its barrier ID corresponds to a cycle ID generated later than the cycle ID of an outgoing item of said second FIFO.

7. The barrier control scheme according to claim 1, wherein said barrier bit and barrier ID generator checks order dependency of an incoming item of said first FIFO with respect to all items in said second FIFO for determining the barrier bit and the barrier ID of the incoming item of said first FIFO.

8. The barrier control scheme according to claim 7, wherein the barrier bit of an incoming item of said first FIFO is set to 0 and the barrier ID of the incoming item is in a don't care condition if there is no order dependency with respect to items in said second FIFO, and the barrier bit of the incoming item is set to 1 and the barrier ID is set to the cycle ID of a latest relevant item in said second FIFO if the incoming item of said first FIFO is dependent on the latest relevant item in said second FIFO.

9. The barrier control scheme according to claim 8, wherein said second FIFO has a PUSH pointer and the latest relevant item in said second FIFO is determined by the location of said PUSH pointer according to a pre-determined rule.

10. The barrier control scheme according to claim 8, wherein an outgoing item of said first FIFO is not blocked if its barrier bit is 0, and the outgoing item is blocked if its barrier bit is 1 and a blocking strategy determined by said cycle ID and barrier ID comparator confirms blocking.

11. The barrier control scheme according to claim 10, wherein an outgoing item of said first FIFO is blocked until said cycle ID and barrier ID comparator indicates that the barrier ID of said outgoing item corresponds to a cycle ID generated earlier than the cycle ID of a current outgoing item of said second FIFO.

12. A method for controlling order dependency of items in a multiple FIFO queue structure having at least a first FIFO and a second FIFO, comprising:

a. generating a cycle ID for each incoming item of said first and second FIFOs;
  b. generating a barrier bit and a barrier ID for an incoming item of said first FIFO;
  c. checking the barrier bit of an outgoing item of said first FIFO;
  d. outputting said outgoing item of said first FIFO if its barrier bit is not set, otherwise executing step e.;
  e. comparing the barrier ID of said outgoing item of said first FIFO with the cycle ID of an outgoing item of said second FIFO; and
  f. outputting said outgoing item of said first FIFO if its barrier ID corresponds to a cycle ID generated earlier than the cycle ID of said outgoing item of said second FIFO, otherwise blocking said outgoing item of said first FIFO and returning to step e.

13. The method according to claim 12, wherein comparing a barrier ID with a cycle ID in said step e. is based on a top-down decision tree having a plurality of leaf nodes and a plurality of non-leaf nodes, each non-leaf node indicating a comparison condition and each leaf node indicating a comparison result, said comparison result being true if the barrier ID corresponds to a cycle ID generated earlier than the cycle ID being compared or false otherwise.

14. The method according to claim 13, wherein said top-down decision tree is formed by comparing a cycle ID and a barrier ID bit-wise from a highest bit to a lowest bit.

15. The method according to claim 12, wherein items of said second FIFO are consumed independently with respect to items of said first FIFO.

16. The method according to claim 12, said step a. generating a sequential number as a cycle ID for each incoming item of said first and second FIFOs, said sequential number ranging from a first number to a last number and restarting from said first number if said last number is reached.

17. The method according to claim 12, said step b. generating a barrier bit and barrier ID generator by checking order dependency of an incoming item of said first FIFO with respect to all items in said second FIFO.

18. The method according to claim 17, wherein in said step b., the barrier bit of an incoming item of said first FIFO is set to 0 and the barrier ID of the incoming item is in a don't care condition if there is no order dependency with respect to items in said second FIFO, and the barrier bit of the incoming item is set to 1 and the barrier ID is set to the cycle ID of a latest relevant item in said second FIFO if the incoming item of said first FIFO is dependent on the latest relevant item in said second FIFO.

19. The method according to claim 18, wherein said second FIFO has a PUSH pointer and in said step b., the latest relevant item in said second FIFO is determined by the location of said PUSH pointer according to a predetermined rule.

* * * * *